United States Patent Office 3,163,664

Patented Dec. 29, 1964

1

3,163,664
21-HEMI-α,β-DIALKYLSUCCINATES OF CORTICOIDS

Erwin S. Gutsell, Jr., Muskegon, and Barney J. Magerlein, Portage Township, Kalamazoo County, Mich., assignors to The Upjohn Company, Kalamazoo, Mich., a corporation of Delaware No Drawing. Filed Mar. 12, 1962, Ser. No. 179,248
3 Claims. (Cl. 260—397.45)

This application is a continuation-in-part of our application Serial No. 519,612, filed July 1, 1955 now U.S. Patent No. 3,025,311.

This invention relates to novel steroidal compounds, particularly to physiologically active, water soluble derivatives of corticoid compounds of the formula

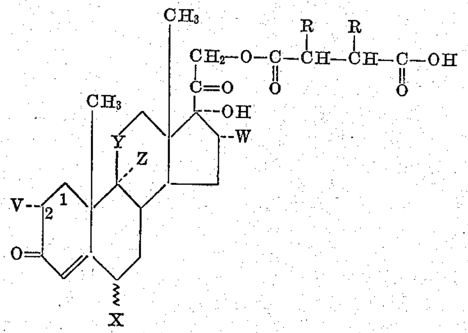

wherein R is an alkyl radical containing from one to eight carbon atoms, inclusive; the 1,2 linkage is selected from the group consisting of single bonds and double bonds; V is selected from the group consisting of hydrogen and methyl; W is selected from the group consisting of hydrogen and fluorine; X is selected from the group consisting of hydrogen, methyl, fluorine and chlorine; ⦚ is a generic expression denoting α and β bonds and mixtures thereof; Y is selected from the group consisting of the β-hydroxymethylene radical

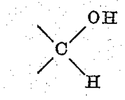

and the carbonyl radical (>C=O); Z is selected from the group consisting of hydrogen and fluorine.

The compounds of this invention of the above formula are useful in those emergency conditions due to acute adrenocortical insufficiency where their corresponding 21-hydroxy counterparts are effective, e.g., lupus erythematosus in relapse, Addisonian crisis, the Waterhouse-Friderichsen syndrome, emergency surgery, acute hypersensitive reactions and bilateral adrenalectomy.

The compounds of this invention of the above formula fulfill a long recognized need in the preparation of aqueous solutions from which hydrocortisone and like physiologically active corticoid hormones can be released into the blood stream rapidly enough to provide the immediate response necessary in emergency conditions of acute adrenal insufficiency, yet also will not hydrolyze on long shelf standing with concomitant precipitation of the free steroid. Experimental studies conducted under comparable conditions on the hydrolysis of various hemiesters of hydrocortisone and similar corticoids, showed the α,β-dialkylhemisuccinates to be the most stable of those tested. The most stable esters of hydrocortisone were found to be the hemi-α,β-diethylglutarate, hemi-β,β'-dimethylglutarate and hemi-α,β-diethylsuccinate. The former two hemi-dialkylesters were shown to be more than five times as stable as the corresponding hemisuccinate, while hydrocortisone 21-hemi-α,β-diethyl-

2 succinate was found to be between ten and twenty times more stable than hydrocortisone hemisuccinate.

The compounds of this invention are water-soluble, physiologically active derivatives of physiologically active corticoid hormones which can be administered parenterally, orally, or topically to humans and valuable domestic animals without difficulty, and from which the corticoid hormonal activity is rapidly made available for its intended function.

The compounds of this invention are especially advantageous in the preparation of ophthalmic solutions, where the precipitation of free steroids would pose a serious hazard by becoming a potential source of harmful ocular irritation. Ophthalmic solutions of steroid hemisuccinates on long shelf standing hydrolyze with precipitation of the free steroid, rendering the preparations unsuitable for their intended use. By employing steroidal α,β-dialkylhemiscuccinates instead of hemisuccinates, the rate of hydrolysis can be greatly slowed to a point where ophthalmic compositions can be prepared that will have a long shelf life.

In carrying out the process of this invention, the free steroidal alcohol is reacted with an excess of the desired carboxylic inner anhydride in a mutual solvent, advantageously, an organic base such as pyridine, lutidine or collidine. The reaction take place at temperature ranging from about room temperature to the refluxing temperature of the solvent employed, with refluxing for from three to six hours being preferred. If the anhydride is sufficiently active or if a longer time is utilized, temperatures below that of the room can be used.

The product ester can be recovered from the reaction mixture by the usual procedures. Advantageously the product is precipitated by adding a liquid which is capable of precipitating the product as the free acid ester or a salt thereof. An aqueous solution of hydrochloric acid or like strong mineral acid can be used advantageously when pyridine or like organic base is used as the mutual solvent. Ordinarily it will be sufficient to pour the reaction mixture slowly into an excess of dilute aqueous hydrochloric acid and then filter off the precipitated product. The product can then be further purified by crystallization from a solvent such as acetone. Suitable other solvents include: ethyl acetate, methyl ethyl ketone, isopropylalcohol and mixtures of the above solvents and Skellysolve B (hexanes).

The free acid ester thus produced can be converted to a salt by neutralization with the appropriate base. Advantageously the free acid ester can be dissolved in a volatile water-miscible solvent, such as acetone, and the solution neutralized by adding aqueous alkali or alcoholic alkali. Advantageously the pH is adjusted from about 7.2 to about 7.4. Other volatile water-miscible solvents include: dioxane, isopropyl alcohol, ethanol, and tetrahydrofuran. The solvent is then removed by vacuum distillation, first the volatile solvent and then the water. Advantageously, the water is removed by lyophilizations. Before lyophilization the water solution can be filter-sterilized if a sterile product is desired. Suitable alkalis are the alkali and alkaline earth metal hydroxides and carbonates, such as sodium, potassium, ammonium, calcium, and magnesium hydroxides and carbonates and lower molecular weight ammonium bases.

*Example 1*

11β,17α,21-trihydroxy-4-pregnene-3,20-dione 21-hemi-α,β-diethylsuccinate (hydrocortisone 21-hemi-α,β-diethylsuccinate) (hydrocortisone 21-hemi-α,α'-diethylsuccinate) (hydrocortisone 21-[hydrogen 2,3-diethylsuccinate])

A solution of 3.64 g. of 11β,17α,21-trihydroxy-4-pregnene-3,2₁-dione (hydrocortisone) and 3.64 g. of α,β-diethylsuccinic anhydride (prepared in accordance with the method disclosed by Baker in J. Amer. Soc. 65, 1577 [1943] or Steinkopf et al. in Annalen 546, 199 [1941]) in 36 ml. of dry pyridine was refluxed for a period of about 4 hours, cooled and added with stirring to a mixture of 550 g. of ice and 55 ml. of concentrated hydrochloric acid. The mixture was extracted with three 120 ml. portions of methylene chloride and the combined organic layers washed first with 100 ml. of dilute (ca. 2%) hydrochloric acid and then with water. The organic layer was extracted with four 120 ml. portions of saturated sodium bicarbonate solution, which was then acidified carefully with 90 ml. of 1:1 concentrated hydrochloric acid-water. The acidified aqueous layer was extracted with three 120 ml. portions of ethyl acetate. The combined ethyl acetate layers were washed with saturated sodium chloride solution, dried over anhydrous sodium sulfate, filtered and concentrated to dryness under reduced pressure. The residue was slurried with anhydrous ether, filtered and dried, to yield 2.17 g. of product with a melting point of 159.5 to 163° C. This solid was dissolved in 15 ml. of acetone, clarified by filtration and the solution concentrated on a steam bath to about 10 ml. Crystallization occurred upon the addition of 3 to 4 ml. of Skellysolve B (hexanes) to yield 820 mg. of 11β,17α,21-trihydroxy-4-pregnene-3,20-dione 21-hemi-α,β-diethylsuccinate with a melting point of 168.5 to 171° C. A sample prepared subsequently melted at 206 to 208.5° C.

*Analysis.*—Calcd. for $C_{29}H_{42}O_8$: C, 67.16; H, 8.16. Found: C, 66.96; H, 8.34.

The infrared and ultraviolet spectra of the thus prepared compound support its proposed structure.

*Example 2*

17α,21-dihydroxy-4-pregnene-3,11,20-trione 21-hemi-α,β-diethylsuccinate (cortisone 21-hemi-α,β-diethylsuccinate)

Following the procedure of Example 1, but substituting cortisone for hydrocortisone as starting material, yields cortisone 21-hemi-α,β-diethylsuccinate.

*Example 3*

11β,17α,21-trihydroxy-1,4 - pregnadiene - 3,20 - dione 21-hemi-α,β-diethylsuccinate (1-dehydrohydrocortisone 21-hemi-α,β-diethylsuccinate)

Following the procedure of Example 1, but substituting 1-dehydrohydrocortisone for hydrocortisone as starting material, yields 11β,17α,21-trihydroxy-1,4-pregnadiene-3,20-dione 21-hemi-α,β-diethylsuccinate.

*Example 4*

6α-methyl-11β,17α,21-trihydroxy-1,4-pregnadiene - 3,20-dione 21-hemi-α,β-diethylsuccinate (6α-methyl-1-dehydrohydrocortisone 21-hemi-α,β-diethylsuccinate)

Following the procedure of Example 1, but substituting 6α-methyl-1-dehydrohydrocortisone for hydrocortisone as starting material, yields 6α-methyl-11β,17α,21-trihydroxy-1,4-pregnadiene-3,20-dione 21 - hemi-α,β-diethylsuccinate with a melting point of 185 to 194° C.

*Example 5*

(*a*) 6α-fluoro-11β,17α,21-trihydroxy-4-pregnene-3,20-dione 21-hemi-α,β-diethylsuccinate;
(*b*) 6β-fluoro-11β,17α,21-trihydroxy-4-pregnene-3,20-dione 21-hemi-α,β-diethylsuccinate;
(*c*) 6α-fluoro-11β,17α,21-trihydroxy-1,4-pregnadiene-3,20-dione 21-hemi-α,β-diethylsuccinate;
(*d*) 6β-fluoro-11β,17α,21-trihydroxy-1,4-pregnadiene-3,20-dione 21-hemi-α,β-diethylsuccinate;
(*e*) 6α-chloro-11β,17α,21-trihydroxy-4-pregnene-3,20-dione 21-hemi-α,β-diethylsuccinate;
(*f*) 6β-chloro-11β,17α,21-trihydroxy-4-pregnene-3,20-dione 21-hemi-α,β-diethylsuccinate;
(*g*) 6α-chloro-11β,17α,21-trihydroxy-1,4-pregnadiene-3,20-dione 21-hemi-α,β-diethylsuccinate;
(*h*) 6β-chloro-11β,17α,21-trihydroxy-1,4-pregnadiene-3,20-dione 21-hemi-α,β-diethylsuccinate.

Carrying out the procedure of Example 1, but substituting for hydrocortisone, the following starting materials:

6α-fluoro-11β,17α,21-trihydroxy-4-pregnene-3,20-dione,
6β-fluoro-11β,17α,21-trihydroxy-4-pregnene-3,20-dione,
6α-fluoro-11β,17α,21-trihydroxy-1,4-pregnadiene-3,20-dione,
6β-fluoro-11β,17α,21-trihydroxy-1,4-pregnadiene-2,20-dione,
6α-chloro-11β,17α,21-trihydroxy-4-pregnene-3,20-dione,
6β-chloro-11β,17α, 21-trihydroxy-4-pregnene-3,20-dione,
6α-chloro-11β,17α,21-trihydroxy-1,4-pregnadiene-3,20-dione and
6β-chloro-1β,17α,21-trihydroxy-1,4-pregnadiene-3,20-dione, yields, respectively, the corresponding 21-hemi-α,β-diethylsuccinates thereof, set forth in (*a*) to (*h*), inclusive, above.

*Example 6*

11β,17α,21-trihydroxy-4-pregnene-3,20 - dione 21 - hemi-α,β-dimethylsuccinate (hydrocortisone 21-hemi-dimethylsuccinate)

A solution of 3.6 g. of 11β,17α,21-trihydroxy-4-pregnene-3,20-dione (hydrocortisone) and 3.5 g. of α,β-dimethylsuccinic anhydride (prepared in accordance with the method disclosed for α,β-diethylsuccinic anhydride in J. Amer. Chem. Soc. 65, 1957 [1943] except that acetaldehyde cyanohydrin and methyl bromide are substituted for propionaldehyde cyanohydrin and ethyl iodide) in 36 ml. of dry pyridine is refluxed for a period of about 4 hours, cooled and added with stirring to a mixture of 550 ml. of ice and 55 ml. of concentrated hydrochloric acid. The mixture is extracted with three 120 ml. portions of methylene chloride and the combined organic layers washed first with 100 ml. of dilute (ca. 2%) hydrochloric acid and then with water. The organic layer is extracted with four 120 ml. portions of saturated sodium bicarbonate solution, which is then acidified carefully with 90 ml. of 1:1 concentrated hydrochloric acid-water. The acidified aqueous layer is extracted with three 120 ml. portions of ethyl acetate. The combined ethyl acetate layers are washed with saturated sodium chloride solution, dried over sodium sulfate, filtered and concentrated to dryness under reduced pressure. The residue is slurried with anhydrous ether, filtered and dried, to yield the desired product. Dissolving this product in acetone and filtering, followed by the addition of a small volume of Skellysolve B to the filtrate yields crystalline 11β,17α,21-trihydroxy-4-pregnene-3,20-dione 21 - hemi-α,β-dimethylsuccinate.

Carrying out the procedure of Example 6, but substituting for α,β-dimethylsuccinic anhydride, the following anhydrides (normal and iso):

α,β-dipropylsuccinic,
α,β-dibutylsuccinic,
α,β-dipentyl,
α,β-dihexyl,
α,β-diheptyl and
α,β-dioctyl, yield, respectively, the corresponding 11β,17α,21-trihydroxy-4-pregnene-2,30-dione 21-hemi-α,β - dialkylsuccinates.

*Example 7*

(*a*) 17α,21-dihydroxy-4-pregnene-3,11,20-trione 21-hemi-α,β-dimethylsuccinate;
(*b*) 11β,17α,21-trihydroxy-1,4-pregnadiene-3,20-dione 21-hemi-α,β-dimethylsuccinate;

(c) 6α-methyl-11β,17α,21-trihydroxy-4-pregnene-3,20-dione 21-hemi-α,β-dimethylsuccinate;
(d) 6α-methyl-11β,17α,21-trihydroxy-1,4-pregnadiene-3,20-dione 21-hemi-α,β-dimethylsuccinate;
(e) 6α-fluoro-11β,17α,21-trihydroxy-4-pregnene-3,20-dione 21-hemi-α,β-dimethylsuccinate;
(f) 6β-fluoro-11β,17α,21-trihydroxy-4-pregnene-3,20-dione 21-hemi-α,β-dimethylsuccinate;
(g) 6α-fluoro-11β,17α,21-trihydroxy-1,4-pregnadiene-3,20-dione 21-hemi-α,β-dimethylsuccinate;
(h) 6β-fluoro-11β,17α,21-trihydroxy-1,4-pregnadiene-3,20-dione 21-hemi-α,β-dimethylsuccinate;
(i) 6α-chloro-11β,17α,21-trihydroxy-4-pregnene-3,20-dione 21-hemi-α,β-dimethylsuccinate;
(j) 6β-chloro-11β,17α,21-trihydroxy-4-pregnene-3,20-dione 21-hemi-α,β-dimethylsuccinate;
(k) 6α-chloro-11β,17α,21-trihydroxy-1,4-pregnadiene-3,20-dione 21-hemi-α,β-dimethylsuccinate;
(l) 6β-chloro-11β,17α,21-trihydroxy-1,4-pregnadiene-3,20-dione 21-hemi-α,β-dimethylsuccinate.

Carrying out the procedure of Example 6, but substituting for hydrocortisone, the following starting materials:

17α,21-dihydroxy-4-pregnene-3,11,20-trione,
11β,17α,21-trihydroxy-1,4-pregnadiene-3,20-dione,
6α-methyl-11β,17α,21-trihydroxy-4-pregnene-3,20-dione,
6α-methyl-11β,17α,21-trihydroxy-1,4-pregnadiene-3,20-dione,
6α-fluoro-11β,17α,21-trihydroxy-4-pregnene-3,20-dione,
6β-fluoro-11β,17α,21-trihydroxy-4-pregnene-3,20-dione,
6α-fluoro-11β,17α,21-trihydroxy-1,4-pregnadiene-3,20-dione,
6β-fluoro-11β,17α,21-trihydroxy-1,4-pregnadiene-3,20-dione,
6α-chloro-11β,17α,21-trihydroxy-4-pregnene-3,20-dione,
6β-chloro-11β,17α,21-trihydroxy-4-pregnene-3,20-dione,
6α-chloro-11β,17β,21-trihydroxy-1,4-pregnadiene-3,20-dione and
6β-chloro-11β,17α,21-trihydroxy-1,4-pregnadiene-3,20-dione, yield, respectively, the corresponding 21-hemi-α,β-dimethylsuccinates thereof, set forth in (a) to (l), inclusive, above.

Carrying out the procedure of Example 6, but substituting for α,β-dimethylsuccinic anhydride, the following anhydrides (normal and iso):

α,β-dipropylsuccinic,
α,β-dibutylsuccinic,
α,β-dipentylsuccinic,
α,β-dihexylsuccinic,
α,β-diheptylsuccinic and
α,β-dioctylsuccinic, yield, respectively, the corresponding 21-hemi-α,β-dialkylsuccinates of the starting materials disclosed in the immediately preceding paragraph.

*Example 8*

(a) 17α,21-dihydroxy-1,4-pregnadiene-3,11-20-trione 21-hemi-α,β-diethylsuccinate;
(b) 6α-methyl-11β,17α,21-trihydroxy-4-pregnene-3,20-dione 21-hemi-α,β-diethylsuccinate;

(c) 2α-methyl-9α-fluoro-11β,17α,21-trihydroxy-4-pregnene-3,20-dione 21-hemi-α,β-diethylsuccinate;
(d) 9α-fluoro-11β,17α,21-trihydroxy-1,4-pregnadiene-3,20-dione 21-hemi-α,β-diethylsuccinate;
(e) 16α-fluoro-11β,17α,21-trihydroxy-1,4-pregnadiene-3,20-dione 21-hemi-α,β-diethylsuccinate;
(f) 9α,16α-difluoro-11β,17α,21-trihydroxy-1,4-pregnadiene-3,20-dione 21-hemi-α,β-diethylsuccinate.

Carrying out the procedure of Example 1, but substituting for hydrocortisone, the following starting materials:

17α,21-dihydroxy-1,4-pregnadiene-3,11-20-trione,
6α-methyl-11β,17α,21-trihydroxy-4-pregnene-3,20-dione,
2α-methyl-9α-fluoro-11β,17α,21-trihydroxy-4-pregnene-3,20-dione,
9α-fluoro-11β,17α,21-trihydroxy-1,4-pregnadiene-3,20-dione,
16α-fluoro-11β,17α,21-trihydroxy-1,4-pregnadiene-3,20-dione and
9α,16α-difluoro-11β,17α,21-trihydroxy-1,4-pregnadiene-3,20-dione, yield, respectively, the corresponding 21-hemi-α,β-diethylsuccinates thereof, set forth in (a) to (f), inclusive, above.

Carrying out the procedure of Example 8, but substituting for α,β-diethylsuccinic anhydride, the following anhydrides (normal and iso):

α,β-dimethylsuccinic,
α,β-dipropylsuccinic,
α,β-dibutylsuccinic,
α,β-dipentylsuccinic,
α,β-dihexylsuccinic,
α,β-diheptylsuccinic,
α,β-dioctylsuccinic, yield, respectively, the corresponding 21-hemi-α,β-dialkylsuccinates of the starting materials disclosed in the immediately preceding paragraph.

We claim:

1. 11β,17α,21-trihydroxy-4-pregnene-3,20-dione 21-hemi-α,β-dialkylsuccinate.

2. 11β,17α,21-trihydroxy-4-pregnene-3,20-dione 21-hemi-α,β-diethylsuccinate.

3. 11β,17α,21-trihydroxy-1,4-pregnadiene-3,20-dione 21-hemi-α,β-dialkylsuccinate.

References Cited by the Examiner

UNITED STATES PATENTS

| | | | |
|---|---|---|---|
| 2,656,366 | 10/53 | Minlon | 260—397.4 |
| 2,838,532 | 6/58 | Spero | 260—397.45 |
| 2,838,543 | 6/58 | Spero | 260—239.55 |
| 2,871,160 | 1/59 | Johnson | 167—77 |
| 2,880,130 | 3/59 | Johnson | 167—65 |
| 2,889,343 | 6/59 | Hanze | 260—397.45 |
| 2,934,546 | 4/60 | Ringold et al. | 260—397.47 |

OTHER REFERENCES

Ringold et al.: Journal of American Chemical Soc., (1958) vol. 80 page 6464.

LEWIS GOTTS, *Primary Examiner.*